US005429695A

United States Patent [19]
Salmeri

[11] Patent Number: 5,429,695
[45] Date of Patent: Jul. 4, 1995

[54] EMULSIFYING AGENT FOR PRODUCING CATIONIC ASPHALT EMULSIONS OF DIFFERENT SETTING TIMES, FOR ROAD CONSTRUCTION AND MAINTENANCE, METHOD OF OBTAINING THE AGENTS AND METHOD FOR ADJUSTING THE SETTING TIME OF THE EMULSIONS

[76] Inventor: Horacio C. Salmeri, General Cardona 1847, Street Wilde, Buenos Aires, Argentina

[21] Appl. No.: 297,771

[22] Filed: Aug. 30, 1994

Related U.S. Application Data

[63] Continuation of Ser. No. 161,077, Dec. 3, 1993, which is a continuation-in-part of Ser. No. 829,533, Feb. 3, 1992, abandoned, which is a continuation-in-part of Ser. No. 319,886, Mar. 7, 1989, abandoned, which is a continuation of Ser. No. 259,143, Oct. 18, 1988, abandoned.

[30] Foreign Application Priority Data

Oct. 20, 1987 [AR] Argentina ............................. 309024

[51] Int. Cl.$^6$ ..................... C08H 5/00; C09D 195/00
[52] U.S. Cl. ................................. 106/218; 106/232; 106/277; 252/357; 527/600
[58] Field of Search .................. 106/218, 232, 277; 252/357; 527/600

[56] References Cited

U.S. PATENT DOCUMENTS 3,423,221  1/1989  Borgfeldt ........................... 106/277
4,859,245  8/1989  Schilling et al. .................. 106/277

*Primary Examiner*—David Brunsman
*Attorney, Agent, or Firm*—Jacobson, Price, Holman & Stern

[57] ABSTRACT

A chemical emulsifier useful to produce a cationic asphalt emulsion of different breaking characteristics, to be applied in road construction and maintenance, the emulsifier comprising a compound obtained by the reaction between a natural wood resin, colophony resin and an amine, whereby, as a result of said reaction, water is liberated as a by-product and primary, secondary and tertiary amino groups are incorporated as substituents to the resin molecules.

9 Claims, No Drawings

EMULSIFYING AGENT FOR PRODUCING CATIONIC ASPHALT EMULSIONS OF DIFFERENT SETTING TIMES, FOR ROAD CONSTRUCTION AND MAINTENANCE, METHOD OF OBTAINING THE AGENTS AND METHOD FOR ADJUSTING THE SETTING TIME OF THE EMULSIONS This is a continuation of application Ser. No. 08/161,077, filed Dec. 3, 1993, which is a continuation-in-part of application Ser. No. 07/829,533, filed Feb. 3, 1992, abandoned, which is a continuation-in-part of application Ser. No. 07/319,886, filed Mar. 7, 1989, abandoned, which is a continuation of application Ser. No. 259,143, filed Oct. 18, 1988, abandoned.

FIELD OF THE INVENTION

This invention refers to a various emulsifying agents for manufacturing cationic asphalt emulsions of different speeds of break, for use in road construction and maintenance, for instance cold concrete, soils and sands stabilizations, slow set and quick set slurry seals.

REFERENCE TO PRIOR ART

There are two basis components in the design of every asphalt mixture; the rock aggregate and the asphalt binder. Most of the problems that could appear will be centered on the aggregate, since it constitutes the majority (about 90–95%) of all mixtures.

This makes it economically advantageous to transport the emulsion to the work site, rather than doing so with the aggregate, and using for each job materials which are available at or near the construction site.

But the emulsifying agents known heretofore produce asphalt emulsions that require the use of rock aggregate meeting minimum conditions for road use, that is, which is composed of sound, clean, hard particles which are resistant to the grinding and crushing action of compaction equipment.

Actual experience shows that an aggregate of appropriate size coming from trituration of granite, basalt and selected gneiss; gravel and clinker from blast furnaces, can be used with good results.

It must not contain soft or slab-shaped particles, and neither can it contain, or be coated with, harmful levels of organic material, dust, vegetable fibers or clay.

The presence of clay, either loose or adhered to the aggregate is highly damaging, as it impedes the adherence.

It is thus important that these materials have a sand equivalent of no less than 80% and the amount of dust (material passing mesh 200) must not exceed 2% approximately.

It is also required that the presence of this dust does not deter covering of the rock with the asphalt cement.

This means, for example, that when a road is to be constructed in an area where there are sand banks, this sand cannot be used in most cases, as it normally tends to have a dust content in excess of 2%.

A sand equivalent of less than 80% and more than the cited 2% of dust, then, constitute undesirable characteristics from the viewpoint of asphalt/stone affinity, since they do not permit an initial covering of 80% of more, provoke premature breakdown of the emulsion which impedes proper mixing in a reasonable time, do not permit production of a film which, once cured, will be resistant to the harmful action of water (passive adherence).

This type of aggregate is particularly critical for the cited emulsifying agents, and as they are not easily obtained throughout the territory, the serious problem arises that in most projects it is necessary to ship in all or a large proportion of the mineral components, with the more than significant freight outlays this implies, apart from all the problems which go hand in glove with the large volumes required; number of vehicles, personnel, maintenance equipment, the need for adequate access roads to ensure the regular provision of these materials, laborers for storing it, etc.

Moreover, climatic conditions have a great influence on the cold asphalt mixtures behavior. Thus, in summer time conditions, with high ambient temperature and warmstone aggregates at storing, it is required to employ asphalt emulsions whose breakdown must be sufficiently slow as to allow mix and coating the aggregates without stripping due to premature breaking.

But in cold and/or wet climate conditions, the same type of asphalt mixture that in summer required an undoubtedly slow emulsion, will require an emulsion whose breaking must be faster although without any risk over neither the quality of the coating nor the adherence between asphalt and stone.

Likewise, despite of the climatic conditions, it is frequently necessary to adequate the emulsion speed of break to the geological and surface characteristics of the aggregate to be used (geological origin; pH on surface; contaminants presence; loose or adhered dust, etc.).

We can affirm that it is always necessary to make a previous investigation taking into account the general job conditions and the selected stone aggregate characteristics, in order to determine which emulsion will be the most adequate for that case.

Oil-in-water type emulsions are disclosed in U.S. Pat. No. 3,423,221 to Borgfeldt. These emulsions are prepared by emulsifying asphalt in water with a emulsifier which is a salt of the product of reaction of an aliphatic polyamine with a wood resin acid. However these emulsions are of the slow setting type and have demonstrated some effectiveness only for applications in slurry seals wherein only fine aggregates can be used in the mixing. No reference is made in this patent to the possibility of varying the time the asphalt takes to coalesce, that is varying the type of emulsion from slow-setting, passing from medium-setting up to rapid-setting by proportioning the content of only one.

SUMMARY OF THE INVENTION

Looking at this situation, it is an object of the invention to provide chemical emulsifying agents for which make it possible to prepare asphalt emulsions which are passively adhesive to the stone aggregate; sufficiently slow in their setting so as to permit their mixture with a fine-grained aggregate with a sand equivalent of less than 50% and a dust content (material passing mesh 200) of up to 5%, so as to make the maximum possible use of any local aggregate which might exist at or near the work site; and the emulsions speed of break may be adequated to the climatic conditions and to the geological and surface characteristics of the aggregate to be used.

It also has been found that the setting time of the emulsion can be adjusted by varying the content of colophony resin, therefore, it is another object of the invention to provide a method for controllably adjusting the setting time of asphalt emulsions obtained by the reaction of a natural wood resin with an organic compound of af amine function, by proportionally adding colophony resin, whereby the setting time of the emulsion can be varied proportionally from a slow-setting type up to a rapid-setting type.

For the purposes of the present specification the term "setting time" must be understood as being the time taken by the emulsion to set, coalesce or breaking, which are equivalent expressions. In summary, rapid-setting emulsions has little or no ability to mix with an aggregate, a medium-setting emulsion is for mixing with coarse but no fine aggregate and slow-setting emulsions are designed to mix with fine aggregate.

DESCRIPTION OF THE PREFERRED EMBODIMENTS

All of these purposes, as well as others which will be indicated presently, have been achieved in a practical manner with the emulsifying agents to produce cationic asphalt emulsions, which are the object of this invention, and which are characterized in its essential aspect and form by being comprised of compounds obtained by a chemical reaction among one natural wood resin, colophony resin and organic compounds of amine function, in which, as a result of such reaction, primary, secondary and tertiary amine groups are incorporated as substituents in the resins molecules, liberating water as a by-product.

The novelty of these formulations consists, essentially, of a molecular condensation among one wood resin, colophony resin and one or more amine compounds.

The employed resins are the following:
1) That obtained from Bulnesia Sarmientoi, named Guaiac resin. Or;
2) That obtained from pines.

Both, 1) and 2), are substantially insoluble in aliphatic solvents and their softening points are about 120°C.

3) Colophony resin, which is completely soluble in aliphatic solvents and its softening point is about 60° C. Colophony must accompany to 1) or 2) resins for the emulsifiers manufacture; the amount of it is from 5% to 40% on the total weight of the formulation. Example:

| GUAIAC RESIN | 60% w/w |
|---|---|
| COLOPHONY | 40% w/w |

The addition of colophony resin makes the final asphalt emulsion more or less slow and this permits selectivity in the formulation, by adapting the emulsion setting characteristics to the type of stone aggregate, climatic conditions, construction method to be used at job, etc.

More precisely, the content of colophony resin can be varied from 5% up to 40% by weight based on the total weight of the wood resin, the amine and the colophony resin. It has been found that the percentage of colophony resin from which the setting time begins to be modified is 5%. That is, % % by weight of colophony resin is equivalent to 0% thereof. This makes the emulsion not only suitable for applications in slurry seals but also in entire pavement structures.

The amines employed to react with the resins combination are the following:

1) Ethyleneamines, like Ethyleneamine (E.A.); Diethyleneamine (D.E.A.); or Diethylenetriamine (D.E.T.A.), employed individually or combining 2 or 3 of them.
2) A mixture of cyclic and linear amines, containing primarily Aminoethylpiperazine (A.E.P.) and Triethylenetetramine (T.E.T.A.), being its typical total amine number 1250 mg KOH/g.

The percentage by weight of the total resins and amine/s may vary from 60-80% for the former and 20-40% for the latter.

In order to illustrate a preparation of one particular product, we can cite the following percentages by weight of each raw material:

| GUAIAC WOOD RESIN | 41% w/w |
|---|---|
| COLOPHONY | 28% w/w |
| D.E.T.A. | 31% w/w |
| Total | 100% w/w. |

What has been described above is produced by the chemical reaction of these components, in the sense that primary, secondary and tertiary amine groups are incorporated as substituents into the resins molecules, causing the mentioned molecular condensation, that is to say, liberating water as a by-product.

The reaction is endothermic, so that it is carried out by heat application. The maximum needed temperature is near 240° C. at atmospheric pressure and it may be modified in approximately ±30% by working at different pressures.

In the reaction of these three elements, the obtained reaction water represents 3-10% of the total weight of the components, free of their natural moisture, which is negligible.

The physical presentation of the different products thus obtained is as thermofusible solid, brittle at ambient temperature, which can be ground or flaked for its stock.

As a variation of the preparation characteristics, these products can be finished in liquid state; when the reaction is complete, it is dissolved in water, using ethyl, methyl or isopropyl alcohol or glycerine as stabilizer, in a proportion of 7-15% of the total weight of the final product. The concentration of this solution is optional, as a function of the desired viscosity of the product to be manufactured.

Another way of making the liquid product is to make a chlorhydrate of it in a medium of ethyl, methyl or isopropyl alcohol, in accordance with the desired viscosity.

These emulsifying agents, both in their solid state (in bulk, ground or flaked), and in their liquid states, are natural resins modified with nitrogenated substances; of cationic nature, which in presence of water and hydrochloric acid form chlorhydrates which are the aqueous phases to obtain the cationic emulsions of the reference, being their dosage approximately 0.2-0.8% for the solid products and 0.6-4.0% for the liquid ones.

It should be noted for illustrative purposes that one formula for preparation of this aqueous phase is the following:

| SOLID EMULSIFYING AGENT | 1% |
|---|---|
| ACIDULATED WATER | 99% | or:

| LIQUID EMULSIFYING AGENT | 2.5% |
|---|---|
| ACIDULATED WATER | 97.5%. |

The acidulated water will have a proportion of, for example, 1 kg hydrochloric acid per 1000 liters water.

As an example of the asphalt emulsions prepared on the basis of any of the cited versions, we note the following proportions:

| ASPHALT | 60% |
|---|---|
| AQUEOUS PHASE | 40%. |

The dispersion of these components, each at appropriate temperature (140°–150° C. for the asphalt; 55°–60° C. for the aq. phase), is carried out according to the usual technique that employs a colloidal mill.

This asphalt emulsion will be mixed with prewetted aggregates, being the amount of water employed to prewetting about 3–10%.

It is unquestionable that when this invention is put into practical use, some modifications may be introduced with respect to certain details of composition and preparation of the invented emulsifying compounds, which will nevertheless remain within the scope of the fundamental principles which are clearly specified in the following claims.

The nature and scope of this invention having been thus described and determined, exclusive ownership and rights are claimed as follows:

I claim:

1. A chemical emulsifier useful to produce a cationic asphalt emulsion of different breaking characteristics, to be applied in road construction and maintenance, the emulsifier comprising a compound obtained by the reaction between a natural wood resin, colophony resin and an amine, whereby, as a result of said reaction, water is liberated as a by-product and primary, secondary and tertiary amino groups are incorporated as substituents to the resin molecules.

2. A chemical emulsifier according to claim 1, wherein the natural wood resin is guaiac resin.

3. A chemical emulsifier according to claim 1, wherein the natural wood resin is pinewood resin.

4. A chemical emulsifier according to claim 1, wherein the amine is ethyleneamine.

5. A chemical emulsifier according to claim 1, wherein the amine is diethyleneamine.

6. A chemical emulsifier according to claim 1, wherein the amine is diethylenetriamine.

7. A chemical emulsifier according to claim 1, wherein the amine is a mixture of ethyleneamines and aminoethylpiperazine.

8. A chemical emulsifier according to claim 7, wherein the aminoethylpiperazine is incorporated in an amount of 60% by weight of the total weight of the amine compounds.

9. A chemical emulsifier according to claim 1, wherein the compound is obtained from a reaction mixture comprising, by weight:

| natural wood resin | from 60% up to 95% |
|---|---|
| amine | from 40% up to 50% |
| colophony resin | from 5% up to 40%. |

* * * * *